(12) United States Patent
Knorr et al.

(10) Patent No.: US 11,536,312 B2
(45) Date of Patent: Dec. 27, 2022

(54) SEALING BELLOWS AND SEALING ARRANGEMENT COMPRISING THE SEALING BELLOWS

(71) Applicant: Carl Freudenberg KG, Weinheim (DE)

(72) Inventors: Rainer Knorr, Berlin (DE); Tatsuro Hosen, Berlin (DE)

(73) Assignee: CARL FREUDENBERG KG, Weinheim (DE)

(*) Notice: Subject to any disclaimer, the term of this patent is extended or adjusted under 35 U.S.C. 154(b) by 707 days.

(21) Appl. No.: 16/569,708

(22) Filed: Sep. 13, 2019

(65) Prior Publication Data
US 2020/0088231 A1    Mar. 19, 2020

(30) Foreign Application Priority Data
Sep. 14, 2018 (DE) ..................... 10 2018 122 495.8

(51) Int. Cl.
*F16C 11/06* (2006.01)
(52) U.S. Cl.
CPC ................. *F16C 11/0671* (2013.01)
(58) Field of Classification Search
CPC ............... Y10T 403/31; Y10T 403/315; F16C 11/0671; F16J 15/52; F16D 3/845
See application file for complete search history.

(56) References Cited

U.S. PATENT DOCUMENTS

| 2,304,732 | A | | 12/1942 | Flumerfelt | |
|---|---|---|---|---|---|
| 2,959,966 | A | * | 11/1960 | Bochan | F16J 3/02 210/365 |
| 3,279,832 | A | * | 10/1966 | Bergman | F16J 15/52 74/18.1 |
| 4,676,513 | A | * | 6/1987 | Tiegs | F16D 3/845 74/18 |
| 4,852,891 | A | | 8/1989 | Sugiura et al. | |
| 5,098,344 | A | * | 3/1992 | Zollinger | F16D 3/845 464/175 |
| 6,796,563 | B2 | * | 9/2004 | Ruebsamen | F16J 3/041 403/220 |
| 7,354,349 | B2 | * | 4/2008 | Wette | F16D 3/845 464/173 |
| 7,597,628 | B2 | * | 10/2009 | Houis | F16D 3/845 403/50 |
| 9,206,923 | B2 | * | 12/2015 | Jackson | F16K 41/106 |

(Continued)

FOREIGN PATENT DOCUMENTS

| DE | 2436062 A1 | 2/1976 |
|---|---|---|
| DE | 3600444 A1 | 7/1986 |

(Continued)

*Primary Examiner* — Matthew R McMahon
(74) *Attorney, Agent, or Firm* — Leydig, Voit & Mayer, Ltd.

(57) ABSTRACT

A sealing bellows made of an elastomeric material includes: a first end face; a second end face; and a casing having a central axis, the casing being arranged in an axial direction between the first and second end faces, the casing including at least one torsion-compensating element for absorbing torsional movements introduced into the sealing bellows substantially without torsional stress. The first end face includes a first static seal and the second end face includes a second static seal. The sealing bellows is made of a TPE material.

7 Claims, 3 Drawing Sheets

(56) References Cited

U.S. PATENT DOCUMENTS

2005/0176512 A1    8/2005  Wette
2018/0045310 A1*   2/2018  Etzold ...................... F16J 15/52

FOREIGN PATENT DOCUMENTS

| DE | 4115446 C1      | 2/1992 |
| DE | 19830184 A1     | 2/1999 |
| DE | 102004034772 A1 | 7/2005 |
| EP | 1233195 A1      | 8/2002 |
| GB | 968053 A        | 8/1964 |
| GB | 1022376 A       | 3/1966 |
| WO | WO 02097186 A2  | 2/1965 |
| WO | WO 2010054171 A2| 5/2010 |

* cited by examiner

SEALING BELLOWS AND SEALING ARRANGEMENT COMPRISING THE SEALING BELLOWS

CROSS-REFERENCE TO PRIOR APPLICATION

Priority is claimed to German Patent Application No. DE 10 2018 122 495.8, filed on Sep. 14, 2018, the entire disclosure of which is hereby incorporated by reference herein.

FIELD

The invention relates to a sealing bellows made of a rubber-elastic material, comprising a first and a second end face and a casing having a central axis, wherein the casing is arranged in the axial direction between the end faces and comprises at least one torsion-compensating element for absorbing torsional movements introduced into the sealing bellows, doing so in a manner substantially free of torsional stress, and wherein the first end face is designed as a first static seal and the second end face is designed as a second static seal.

The invention further relates to a sealing arrangement comprising such a sealing bellows.

BACKGROUND

Such a sealing bellows, which forms part of a sealing arrangement, is known from DE 24 36 062 A1.

The previously known sealing bellows is provided in order to be able to execute relatively large torsional movements directed in opposite directions and/or relative axial movements and/or angular movements—in each case between the end faces of the sealing bellows—without being damaged or destroyed.

The torsion-compensating element of the previously known sealing bellows comprises first folds which in a plan view of the sealing bellows extend at an angle to the central axis, substantially diagonally between the end faces of the sealing bellows.

Axial movements of the end faces of the sealing bellows relative to one another are absorbed by second folds which are designed to be self-contained in the circumferential direction, in a similar fashion to a conventional bellows.

Further details of the material from which the sealing bellows is made are not provided.

Sealing bellows made of elastomeric materials seal dynamically with respect to a ball pivot.

SUMMARY

In an embodiment, the present invention provides a sealing bellows made of an elastomeric material, comprising: a first end face; a second end face; and a casing having a central axis, the casing being arranged in an axial direction between the first and second end faces, the casing including at least one torsion-compensating element configured to absorb torsional movements introduced into the sealing bellows substantially without torsional stress, wherein the first end face comprises a first static seal and the second end face comprises a second static seal, and wherein the sealing bellows comprises a TPE material.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
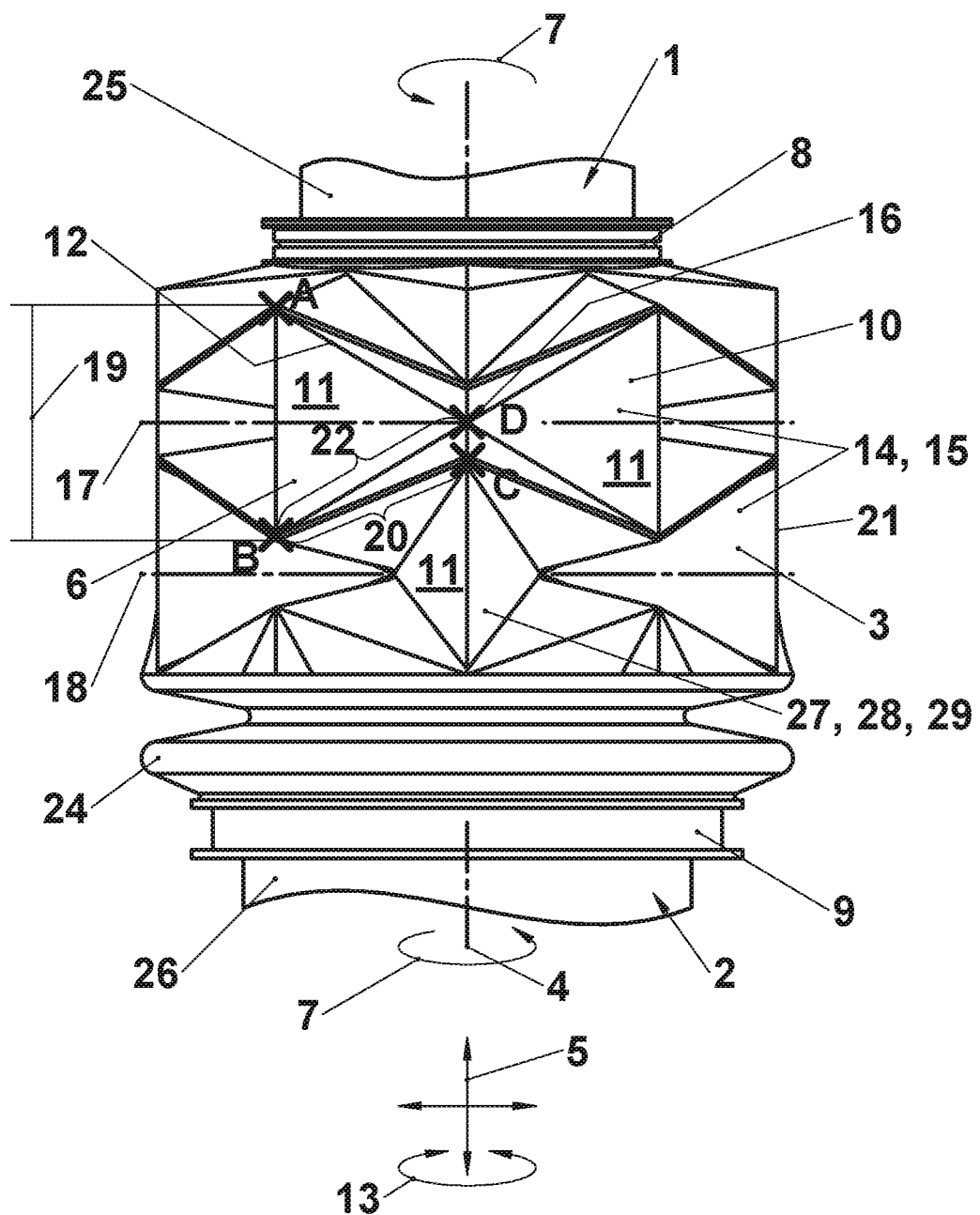
FIG. 1 shows an exemplary embodiment of a sealing arrangement according to the invention comprising the sealing bellows according to the invention.

In an embodiment, the present invention provides a sealing bellows of the type mentioned at the outset of such a kind as to have improved service properties over a long service life and to be producible reliably, quickly, simply and cost-effectively. The same should apply to the sealing arrangement.

In order to achieve the object, it is provided that the sealing bellows consists of a TPE material. Thermoplastic elastomers (TPEs) are materials which have rubber-elastic properties and are therefore in fact particularly suitable for the production of sealing bellows. TPE materials can be processed in short cycle times and can be extruded, injection-molded, or blow-molded, for example.

A general disadvantage of TPE materials, however, is that TPE materials do not have the favorable and also required properties of elastomeric material to be able to seal dynamically using beads or sealing lips.

TPE materials have for this reason not been used in the production of sealing bellows.

If TPE materials are nevertheless to be used for the production of sealing bellows, it will be necessary, with regard to good service properties over a long service life, for the two end faces to be designed as static seals. However, if the two end faces are designed as static seals, a torsion-compensating element will also need to be provided in order to be able to absorb the torsional stresses occurring in the torsion-compensating element during the intended use of the sealing bellows or at least to mitigate them to a non-critical level for a long service life.

The combination of the previously described static seals on the end faces on both ends of the sealing bellows, the torsion-compensating element and the TPE material ensures that the sealing bellows not only will have good service properties over a long service life, but will also be producible reliably, quickly, simply and cost-effectively. The object described at the outset is thus achieved.

A particularly effective absorption of torsional stresses in the torsion-compensating element is achieved if the torsion-compensating element comprises an origami structure, having folding elements which are connected to one another in a relatively movable manner by bends, wherein the folding elements are movable relative to one another substantially without stress when torsional movements are introduced into the sealing bellows in the circumferential direction of the casing. Such an origami structure is advantageous because it has compact dimensions and, despite its compact dimensions, can absorb large torsional angles of the two end faces of the sealing bellows relative to one another, doing so virtually without stress.

The origami structure may comprise three-dimensional basic shapes with the folding elements, wherein each basic shape is preferably takes the form of a concave hexagonal pyramid, the apex of which is disposed in the direction of the central axis of the sealing bellows, and wherein the basic shapes are arranged on an imaginary first radial plane of the casing and adjacent to one another in the circumferential direction. In contrast to other basic shapes, concave hexagonal pyramids are particularly well-suited for absorbing torsional movements of the two end faces relative to one another.

If large torsional angles of the two end faces of the sealing bellows relative to one another are to be absorbed by the origami structure, it can be provided that an imaginary second radial plane of the casing is arranged axially adjacent to the imaginary first radial plane of the casing, in which further three-dimensional basic shapes are arranged adjacent to one another in the circumferential direction, wherein the basic shapes in the first and the second imaginary radial planes, seen in the circumferential direction, are each arranged offset from one another by half a basic shape. Due to the offset arrangement of the basic shapes by half a basic shape in the respective radial planes, the dimensions of the sealing bellows in the axial direction are minimized. Axially adjacent basic shapes from the two radial planes overlap each other in the axial direction.

Despite the possibility of absorbing large torsional angles of the end faces relative to one another, the entire origami structure has very compact dimensions in the axial direction.

Preferably, it can be provided that each basic shape is folded in accordance with a folding condition (A to B)≈(B to C)<(B to D), wherein (A to B) is the axial width of the pyramid, (B to C) is half the extent of the pyramid on the circumference of the sealing bellows, and (B to D) is the depth of the pyramid in the direction of the central axis from the circumference of the sealing bellows to the apex of the pyramid, and that the casing has a folding range ±β, wherein β is a maximum torsional angle in the circumferential direction, on the basis of the production-related geometry of the sealing bellows in the undeformed state. This folding condition describes the basic shape in the form of a concave hexagonal pyramid.

The folding range ±β is preferably −40° to +40°. Such a folding range is sufficient for most application cases in the field of the steering/chassis of motor vehicles and can be achieved well with the above-described basic shapes arranged on the two imaginary radial planes.

In addition to the torsion-compensating element, the casing can have at least one fold which runs circumferentially and is of a self-contained design, wherein the torsion-compensating element and the fold are arranged directly adjacent to one another in the axial direction. In this case, it is advantageous for the sealing bellows to have a functional separation provided by such a development, with two functional regions arranged adjacent to one another in the axial direction. One of the functional regions has the origami structure and the other functional region has the at least one previously described fold which is self-contained in the circumferential direction. In terms of functionality the two functional regions are arranged in a parallel connection. The functional region with the origami structure predominantly absorbs torsional movements substantially without torsional stress and the functional region with the fold predominantly absorbs angular movements and axial movements of the end faces of the sealing bellows relative to one another.

If required, two torsion-compensating elements can be used in a sealing bellows. In such a case, a torsion-compensating element can preferably be arranged on each of the end faces on both sides of the functional region with the at least one fold. Relatively large torsional movements can thereby be compensated for by a larger folding range.

The invention further relates to a sealing arrangement comprising a sealing bellows, as described above, and a first and a second machine element which are arranged so as to be pivotable relative to one another by means of a joint, wherein the first end face of the sealing bellows surrounds the first machine element with its static first seal in a statically sealing manner and the second end face of the sealing bellows surrounds the second machine element with its static second seal in a statically sealing manner.

The joint may be designed as a ball pivot joint comprising a joint seat and a ball pivot which is accommodated in the joint seat, wherein the first machine element is formed by the joint seat and the second machine element is formed by the ball pivot. During the intended use of the sealing arrangement, the ball pivot pivots in the joint and the resulting relative rotations are absorbed in the torsion-compensating element by its origami structure.

FIG. 1 shows a sealing arrangement comprising the sealing bellows according to the invention. In addition to the sealing bellows, the sealing arrangement comprises a first machine element 25 which is designed as a joint seat 28 and a second machine element 26 which is formed by a ball pivot 29 arranged in the joint seat 28. The first machine element 25 and the second machine element 26 are pivotally and rotatably connected to each other by the joint 27 formed by a ball pivot joint. The joint 27, the joint seat 28 and the ball pivot 29 are enclosed on the outside by the sealing bellows and are therefore hidden in FIG. 1 by the sealing bellows.

The first end face 1 of the sealing bellows surrounds the first machine element 25 with its static first seal 8 in a statically sealing manner and the second end face 2 of the sealing bellows surrounds the second machine element 26 with its static second seal 9 in a statically sealing manner.

The sealing bellows prevents contaminants from entering the joint 27 between the two machine elements 25, 26 and leading to functional impairments, in particular to a restricted mobility of the joint 27. Leakage of grease from the joint 27 is also prevented.

The sealing bellows consists of a TPE material. Such a material is substantially rubber-elastic, but can nevertheless be processed reliably, quickly and simply in short cycle times, which is particularly advantageous in economic terms.

The sealing bellows comprises the two end faces 1, 2 as well as the casing 3 which is arranged in the axial direction 5 between the end faces 1, 2. The sealing bellows surrounds the central axis 4.

The casing 3 is divided into two functional regions, wherein one of the functional regions has the torsion-compensating element 6 and the other functional region has the fold 24 which runs circumferentially and is of a self-contained design. The torsion-compensating element 6 and the fold 24 are arranged directly adjacent to one another in the axial direction 5. The torsion-compensating element 6 is provided for the essentially torsional-stress-free absorption of torsional movements 7 introduced into the sealing bellows; the fold 24 being able to compensate for angular movements of the interconnected machine elements 25, 26 or their axial mobility relative to one another.

The first end face 1 of the sealing bellows forms the first static seal 8 and the second end face 2 forms the second static seal 9. A relative movability between the end faces 1, 2 and the machine elements 25, 26 therefore does not take place.

The torsion-compensating element 6 has an origami structure 10 and comprises folding elements 11 which are connected to one another in a relatively movable manner by bends 12. Due to the relative movability of the folding elements 11 and the bends 12, torsional movements 7 introduced into the sealing bellows in the circumferential direction 13 of the casing 3 can be absorbed substantially without torsional stress.

In the exemplary embodiment shown, the origami structure 10 comprises two imaginary radial planes 17, 18 in each of which the three-dimensional basic shapes 14 are arranged adjacent to one another in the circumferential direction 13. The basic shapes 14 are designed to correspond in both radial planes 17, 18. The basic shapes 14 in the first radial plane 17 are offset from the basic shapes 14 in the second radial plane 18—seen in the circumferential direction—in each case by half a basic shape 14. As a result, the origami structure 10 has particularly compact dimensions in the axial direction 5 and yet has a large folding range ±β, which in the exemplary embodiment shown is about −40° to +40°.

The origami structure 10 is formed by a plurality of basic shapes 14, wherein the basic shapes 14 are folded in accordance with the folding condition (A to B)≈(B to C)<(B to D), wherein (A to B) is the axial width 19 of the pyramid 15, (B to C) is half the extent 20 of the pyramid 15 along the circumference 21 of the sealing bellows, and (B to D) is the depth 22 of the pyramid 15 in the direction of the central axis 4 from the circumference 21 of the sealing bellows to the apex 16 of the pyramid 15. The casing 3 has a folding range ±β, wherein β is a maximum torsion angle 23 in the circumferential direction 13, on the basis of the production-related geometry of the sealing bellows in the undeformed state.

Figure 2:
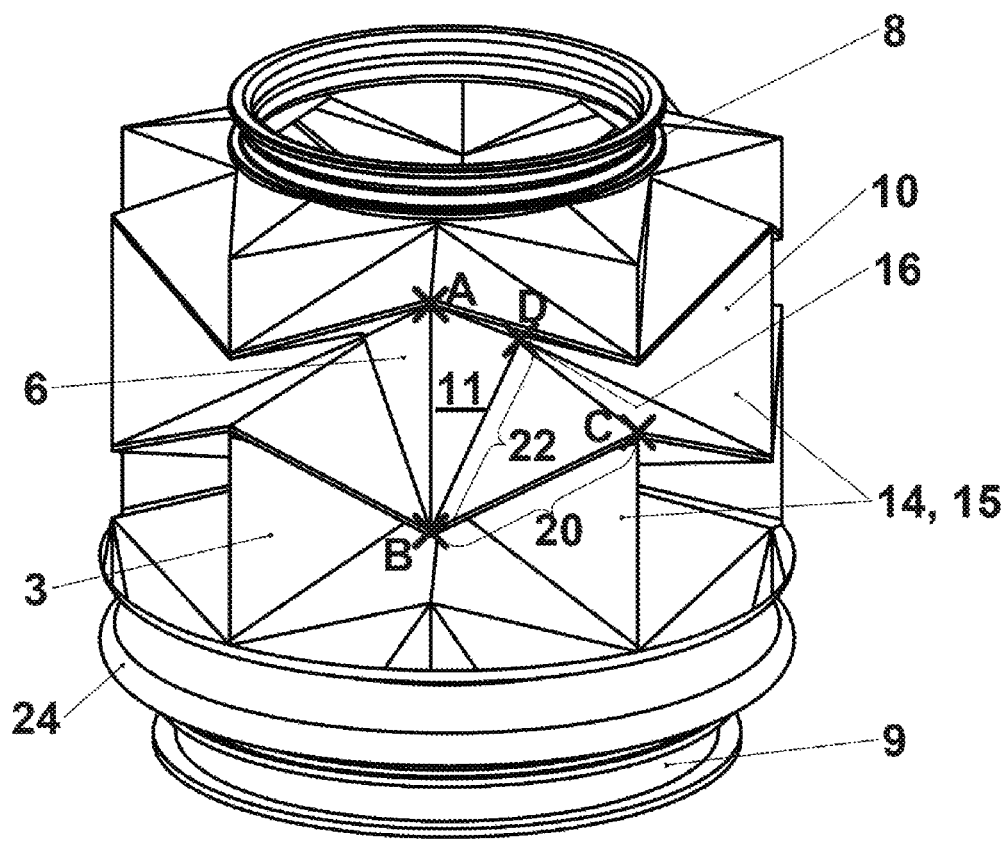
FIGS. 2 and 3 show the sealing bellows from FIG. 1 in each case in a perspective view.
Figure 3:
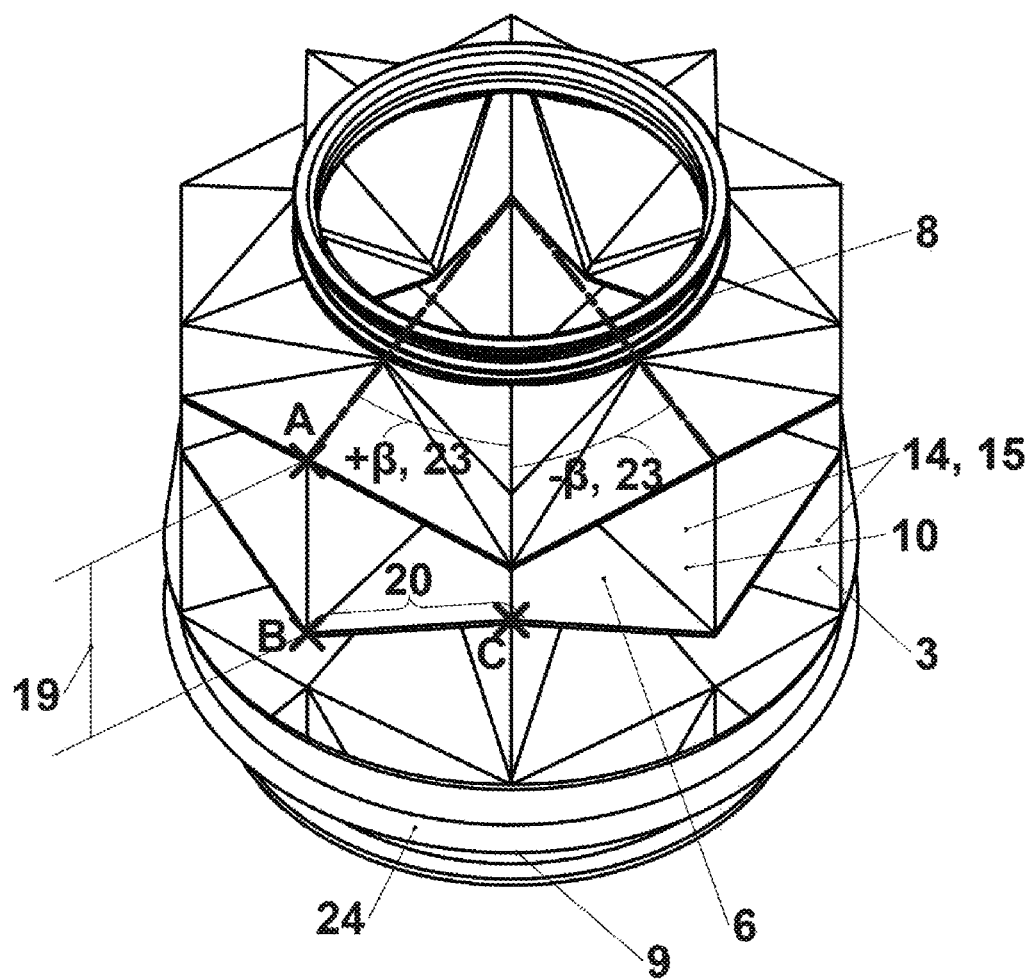

In FIGS. 2 and 3, the sealing bellows from FIG. 1 is shown in each case as a single part and in a perspective view. It can be seen that the ratio of the axial length of the sealing bellows to its diameter is substantially 1. Despite the very compact dimensions in the axial direction 5, the folding range β, as already explained above, is about −40° to +40° and is thus considerably large.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sealing bellows made of an elastomeric material, comprising:
    a first end face;
    a second end face; and
    a casing having a central axis, the casing being arranged in an axial direction between the first and second end faces, the casing comprising at least one torsion-compensating element configured to absorb torsional movements introduced into the sealing bellows substantially without torsional stress,
    wherein the first end face comprises a first static seal and the second end face comprises a second static seal,
    wherein the sealing bellows comprises a TPE material,
    wherein the torsion-compensating element comprises an origami structure having folding elements which are connected to one another in a relatively movable manner by bends,
    wherein the folding elements are movable relative to one another when torsional movements are introduced into the sealing bellows in a circumferential direction of the casing,
    wherein the origami structure comprises three-dimensional basic shapes with the folding elements,
    wherein each basic shape comprises a concave hexagonal pyramid, an apex of which is disposed in a direction of the central axis of the sealing bellows, and
    wherein the basic shapes are arranged on an imaginary first radial plane of the casing and adjacent to one another in the circumferential direction.

2. The sealing bellows according to claim 1, wherein each basic shape is folded according to a folding condition (A to B)≈(B to C)<(B to D),
    wherein (A to B) comprises an axial width of the pyramid, (B to C) comprises half an extent of the pyramid at a circumference of the sealing bellows, and (B to D) comprises a depth of the pyramid in a direction of the central axis from the circumference of the sealing bellows to the apex of the pyramid, and
    wherein the casing has a folding range ±β, wherein β is a maximum torsion angle in the circumferential direction, on a basis of a production-related geometry of the sealing bellows in the undeformed state.

3. The sealing bellows according to claim 2, wherein the folding range is −40° to +40°.

4. The sealing bellows according to claim 1, wherein the casing further comprises, in addition to the torsion-compensating element, at least one fold which runs circumferentially and is of a self-contained design, and
    wherein the torsion-compensating element and the fold are arranged directly adjacent to one another in the axial direction.

5. A sealing arrangement, comprising:
    the sealing bellows according to claim 1; and
    a first and a second machine element which are arranged so as to be pivotable relative to one another by a joint,
    wherein the first end face of the sealing bellows surrounds the first machine element with its static first seal in a statically sealing manner and the second end face of the sealing bellows surrounds the second machine element with its static second seal in a statically sealing manner.

6. The sealing arrangement according to claim 5, wherein the joint comprises a ball pivot joint, comprising a joint seat and a ball pivot which is accommodated in the joint seat, and
    wherein the first machine element is formed by the joint seat and the second machine element is formed by the ball pivot.

7. A sealing bellows made of an elastomeric material, comprising:
- a first end face;
- a second end face; and
- a casing having a central axis, the casing being arranged in an axial direction between the first and second end faces, the casing comprising at least one torsion-compensating element configured to absorb torsional movements introduced into the sealing bellows substantially without torsional stress, wherein the first end face comprises a first static seal and the second end face comprises a second static seal, wherein the sealing bellows comprises a TPE material, wherein the torsion-compensating element comprises an origami structure having folding elements which are connected to one another in a relatively movable manner by bends, wherein the folding elements are movable relative to one another when torsional movements are introduced into the sealing bellows in a circumferential direction of the casing, wherein the origami structure comprises three-dimensional basic shapes with the folding elements, wherein each basic shape comprises a concave hexagonal pyramid, an apex of which is disposed in a direction of the central axis of the sealing bellows, wherein the basic shapes are arranged on an imaginary first radial plane of the casing and adjacent to one another in the circumferential direction, wherein an imaginary second radial plane of the casing is arranged axially adjacent to the imaginary first radial plane of the casing, in which further three-dimensional basic shapes are arranged adjacent to one another in the circumferential direction, and wherein the basic shapes in the first and the second imaginary radial planes are each arranged offset relative to one another, seen in the circumferential direction, by half a basic shape.

* * * * *